(No Model.)
A. H. DENIS.
COFFEE POT.
No. 350,818.  Patented Oct. 12, 1886.
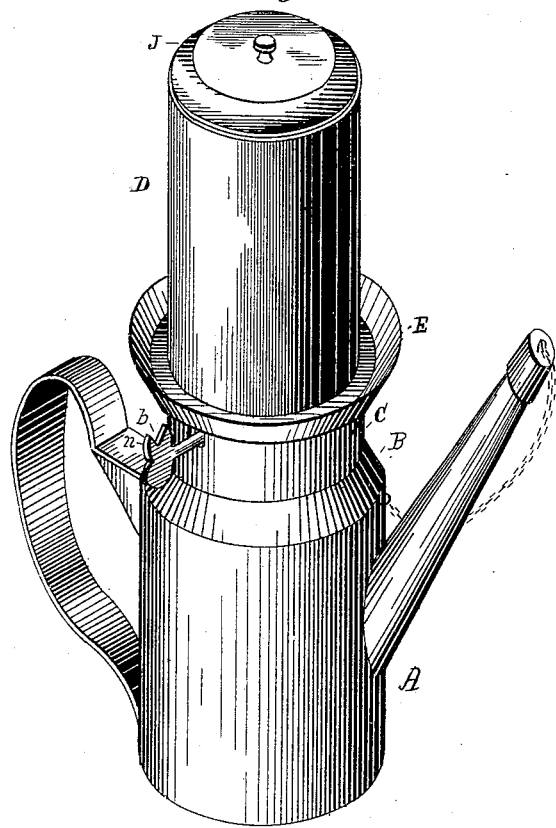
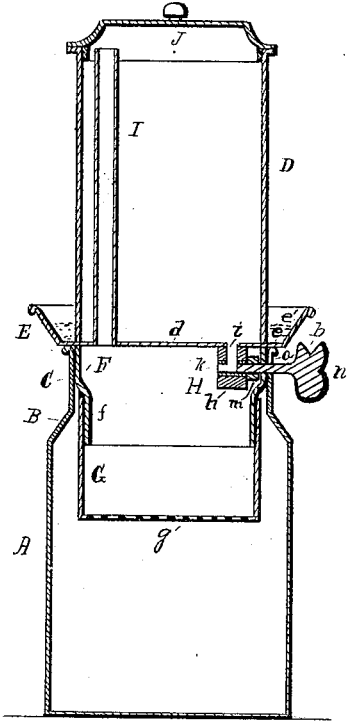
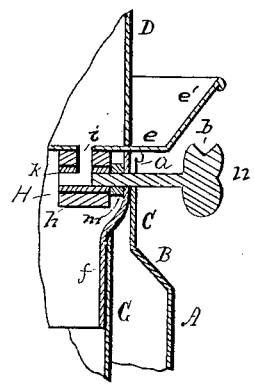
Witnesses:
B. C. Fenwick
E. M. Chancey
Augustus H. Denis
Inventor.
By
M. D. Peck
Attorney

UNITED STATES PATENT OFFICE.

AUGUSTUS H. DENIS, OF NEW ORLEANS, LOUISIANA.

COFFEE-POT.

SPECIFICATION forming part of Letters Patent No. 350,818, dated October 12, 1886.

Application filed May 20, 1886. Serial No. 202,778. (No model.)

*To all whom it may concern:*

Be it known that I, AUGUSTUS H. DENIS, a citizen of the United States, residing at New Orleans, in the parish of Orleans and State of Louisiana, have invented certain new and useful Improvements in Coffee-Pots; and I do hereby declare the following to be a full, clear, and exact description of the invention, such as will enable others skilled in the art to which it appertains to make and use the same, reference being had to the accompanying drawings, which form part of this specification.

My invention relates to that class of coffee-pots which is provided with a reservoir on the upper edge of the body of the pot, and has for its object the provision of a more efficient means for heating the water in the reservoir, and then for the discharge of the same into the coffee-chamber than has heretofore been provided, and it consists in the construction hereinafter described, and more particularly pointed out in the claims.

Referring to the drawings, Figure 1 is a perspective view of my device in a position ready for use. Fig. 2 is a vertical sectional view of Fig. 1 through the stop-cock and air-vent. Fig. 3 is a detail sectional view, enlarged to show the stop-cock.

Like letters of reference refer to corresponding parts in each figure of the drawings.

A represents the main body of a coffee-pot, having the ordinary handle and spout. Near the top of the main body there is an inwardly conical projection, B, from the edge of which rises a vertical portion, C, beaded at its edge to form the upper end of the main body of the pot, which is somewhat less in diameter than that of its lower end.

D represents a heating-reservoir slightly less in diameter than the upper end of the main body. The bottom $d$ of the reservoir is much larger in diameter than the cylinder to which it is secured. About one-third of the extended portion E is upon the same plane with the bottom proper, as shown at $e$, while the remaining two-thirds is turned upward and outward into a flange, $e'$. By this construction of the bottom extended a fuel-trough is formed which encircles the reservoir, and is adapted to contain inflammable liquid for heating the contents of the reservoir, while the portion $e$ forms a bearing on its under side to rest upon the upper edge of the main body A and support the reservoir above.

From beneath the bottom $d$ of the reservoir there is a downwardly-extended flange, F, which is of the same size as the reservoir. This flange is bent inward or slightly reduced in diameter at $f$ to receive a cup-shaped coffee-chamber, G, thereon, which has its bottom $g$ perforated to enable the heated water as it comes from the reservoir to percolate through the ground coffee in the chamber and fall into the main body of the coffee-pot.

Secured to the under side of the bottom $d$ at one edge is a stop-cock, H, having a socket, $h$, with a hole, $i$, in one of its sides registering with a hole in the bottom of the reservoir. Within this socket there is a valve consisting of a tube, $k$, having a hole in one of its sides, adapted to be turned so as to register with the hole $i$ in the socket. In the outer end of the valve there is secured a projecting handle, which is provided with a collar, $m$, between the socket $h$ and the flange F. This handle extends through a hole in the flange and is received in a notch, $a$, in the main body of the coffee-pot when the reservoir rests on its top, and terminates in a thumb-piece, $n$, at its outer end, having an indicating-notch, $b$, in one of its sides. In the bottom $d$ of the reservoir there is also a hole communicating with the coffee-chamber G, around which is secured a tube, I, that extends upward and within the reservoir to its full height. This tube is for the purpose of providing means of escape for the air and steam from the chamber G as the heated water descends from the reservoir through the valve. On top of the reservoir there is provided a double flanged cover, J. One of the flanges of the cover is made to project over the top, while the other is passed down upon the inside of the reservoir to form a practically tight joint.

In operation the ground coffee is placed in the coffee-chamber G, which is then tightly crowded on the reduced portions $f$ of the depending flange F from the bottom. The reservoir is then placed on the main body of the coffee-pot, and the stop-cock H closed by turning the notch $b$ in the thumb-piece downward. The reservoir is then filled with water and the cover placed thereon, when the alcohol, oil, or other inflammable fluid used is placed in the trough and ignited. The quantity of water held by the reservoir will be brought to the temperature of boiling at about the same time the quantity of inflammable fluid held by the trough is consumed. After the water is heated the stop-cock is opened by turning the notch in the thumb-piece upward, thereby revolving the tube $k$ in the socket $h$, so that its side opening registers with the hole in the socket, providing a free communication between the reservoir and chamber. The water quickly percolates through the ground coffee and passes through the perforated bottom $g$, and is ready for use. By this construction intense heat is brought to bear upon the entire outer surface of the reservoir by means of a flame encircling it, so that the water therein is brought to a boiling-point in about three minutes. This enables the consumer to prepare his own coffee in a very few moments whenever it is desired for use.

Having thus fully described my invention, what I claim as new, and desire to secure by Letters Patent of the United States, is—

1. In a coffee-pot, the combination of a main body or vessel, a heating-reservoir having an enlarged bottom extended to form a fuel-trough around it, the under side of which forms a support for the reservoir on the top of the main vessel, a flange depending from the bottom of the reservoir to fit within the main vessel and reduced in diameter in its lower portion, and a coffee-chamber suspended therefrom, as and for the purpose set forth.

2. In a coffee-pot, the combination of a main body reduced in diameter at its upper end and having a notch in one side thereof, a heating-reservoir having its bottom covering and resting on the top of the main body, and extending beyond the sides of the reservoir to form a fuel-trough, a coffee-chamber depending from the bottom, a tube depending from the bottom of the reservoir and communicating with the coffee-chamber, and a stop-cock having its handle extending outward through the notch, as and for the purpose set forth.

3. In a coffee-pot, the combination, with the main body reduced in diameter at its upper end, of a heating-reservoir thereon provided with a bottom extended to form a fuel-trough around it, and a flange extending from its under side and reduced in diameter at its lower end with a cup-shaped coffee-chamber suspended therefrom, a depending discharge-tube, and a stop-cock to open and close it, and a tube extending within the reservoir to vent the chamber below, as and for the purpose set forth.

In testimony whereof I affix my signature in presence of two witnesses.

AUGUSTUS H. DENIS.

Witnesses:
E. M. CHANCEY,
M. D. PECK.